(12) United States Patent
Griffith et al.

(10) Patent No.: US 6,747,369 B2
(45) Date of Patent: Jun. 8, 2004

(54) POWER SYSTEM INCLUDING REDUNDANT POWER SUPPLIES

(75) Inventors: Brian J. Griffith, Seattle, WA (US); Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/225,876

(22) Filed: Aug. 22, 2002

(65) Prior Publication Data

US 2004/0036359 A1 Feb. 26, 2004

(51) Int. Cl.$^7$ .................................................. H02J 1/10
(52) U.S. Cl. ........................................................ 307/43
(58) Field of Search .............................. 307/43, 44, 64, 307/65, 85

(56) References Cited

U.S. PATENT DOCUMENTS

| | | | | |
|---|---|---|---|---|
| 3,946,375 A | * | 3/1976 | Bishop et al. ............... | 340/635 |
| 5,319,536 A | * | 6/1994 | Malik .......................... | 363/65 |
| 5,559,376 A | * | 9/1996 | Tachikawa ................... | 307/86 |
| 5,668,417 A | * | 9/1997 | Wiscombe et al. ........... | 307/64 |
| 5,917,253 A | * | 6/1999 | Rusnack ...................... | 307/64 |
| 5,939,799 A | * | 8/1999 | Weinstein .................... | 307/64 |
| 6,018,204 A | * | 1/2000 | Kuruma ....................... | 307/64 |
| 6,031,298 A | * | 2/2000 | Lo et al. ...................... | 307/64 |
| 6,308,240 B1 | * | 10/2001 | De Nicolo ................... | 710/300 |
| 6,388,658 B1 | * | 5/2002 | Ahern et al. ................. | 345/168 |
| 6,501,196 B1 | * | 12/2002 | Lo .............................. | 307/125 |
| 6,608,403 B2 | * | 8/2003 | Liu et al. ..................... | 307/77 |

* cited by examiner

Primary Examiner—Gregory J. Toatley, Jr.
(74) Attorney, Agent, or Firm—Carrie Boone; Carrie A. Boone, P.C.

(57) ABSTRACT

A power system is disclosed for receiving dual alternating current sources and delivering direct current to drive a load. The power system comprises four power supplies and two transfer switch modules, any of which may be removed and replaced without disabling the power system. Three of the power supplies deliver current to drive the load while the fourth is redundant. A transfer switch control circuit activates relays within the transfer switch modules, in response to a change in the voltage maintained by one or both AC sources. As long as one of the AC sources maintains a voltage within a predetermined voltage range, three of the power supplies deliver current to drive the load.

30 Claims, 7 Drawing Sheets

POWER SYSTEM INCLUDING REDUNDANT POWER SUPPLIES

FIELD OF THE INVENTION

This invention relates to power supplies and, more particularly, to a fault-tolerant dual AC source redundant power supply system.

BACKGROUND OF THE INVENTION

Power supplies may more precisely be called power converters because they receive a power source and change the source according to the demands of a load. For example, the power source may be a 120-volt alternating current (AC) power from an electrical outlet in a home or business and the load may be a personal computer motherboard requiring 5 volts of direct current (DC) power. Coupled between the source and load, the power supply is expected to reliably convert 120 volts AC to 5 volts DC.

The power supply typically includes a transformer, a rectifier, a filter, and a regulator. The transformer steps the incoming AC voltage either up or down and the rectifier converts the transformed voltage Into a pulsating unipolar (DC) voltage. The filter then smoothes out the voltage to a continuous one, and the regulator assures that a voltage within a certain range is supplied to the load at all times.

In addition to personal computers, many other power-consuming devices depend on power supplies for reliable operation. Mainframe computers, banking and traffic control systems, hospital equipment, emergency infrastructure, and security systems are but a few examples of systems in which disruption in service can be catastrophic or even life-threatening.

In such environments, power systems comprising multiple redundant power supplies may be used to avoid power disruptions. Such power systems are designed to connect to multiple power sources, and include circuitry for ensuring that, where at least one source is available, power to the load system remains uninterrupted.

The cost of redundancy, however, is not cheap. In a typical computer system, for example, a single power supply occupies a significant amount of space and generates enough heat to usually require its own fan. It is easy to understand why few stand-alone computer systems have redundant power supplies. For servers, mainframes, and other large-scale processing systems, however, redundant power supplies may be cost-justified, although these systems are often space-constrained as well.

Further, many power systems comprising redundant power supplies cannot conveniently be powered down for maintenance. If a component within the power system needs replacing, typically, it can only be replaced by turning the system off, e.g., removing the AC power source. This is the exact condition the power system was installed to avoid.

Thus, there is a continuing need to provide a power system comprising redundant power supplies, wherein the power system supports dual AC sources, is not prohibitive in size, and includes components that may be replaced while the system is operational.

DETAILED DESCRIPTION

In accordance with the embodiments described herein, a power system for receiving dual alternating current sources and supplying direct current to drive a load is disclosed. The power system comprises four power supplies and two transfer switch modules, any of which may be removed and replaced from the power system during operation. A transfer switch control circuit activates, by opening or energizing, various relays within the transfer switch modules, in response to a change in one or both of the AC sources. As long as one of the AC sources maintains a voltage within a predetermined voltage range, three of the power supplies operate to deliver the direct current to the load. When both AC lines maintain voltages within the predetermined voltage ranges, all four power supplies are active.

Figure 1:
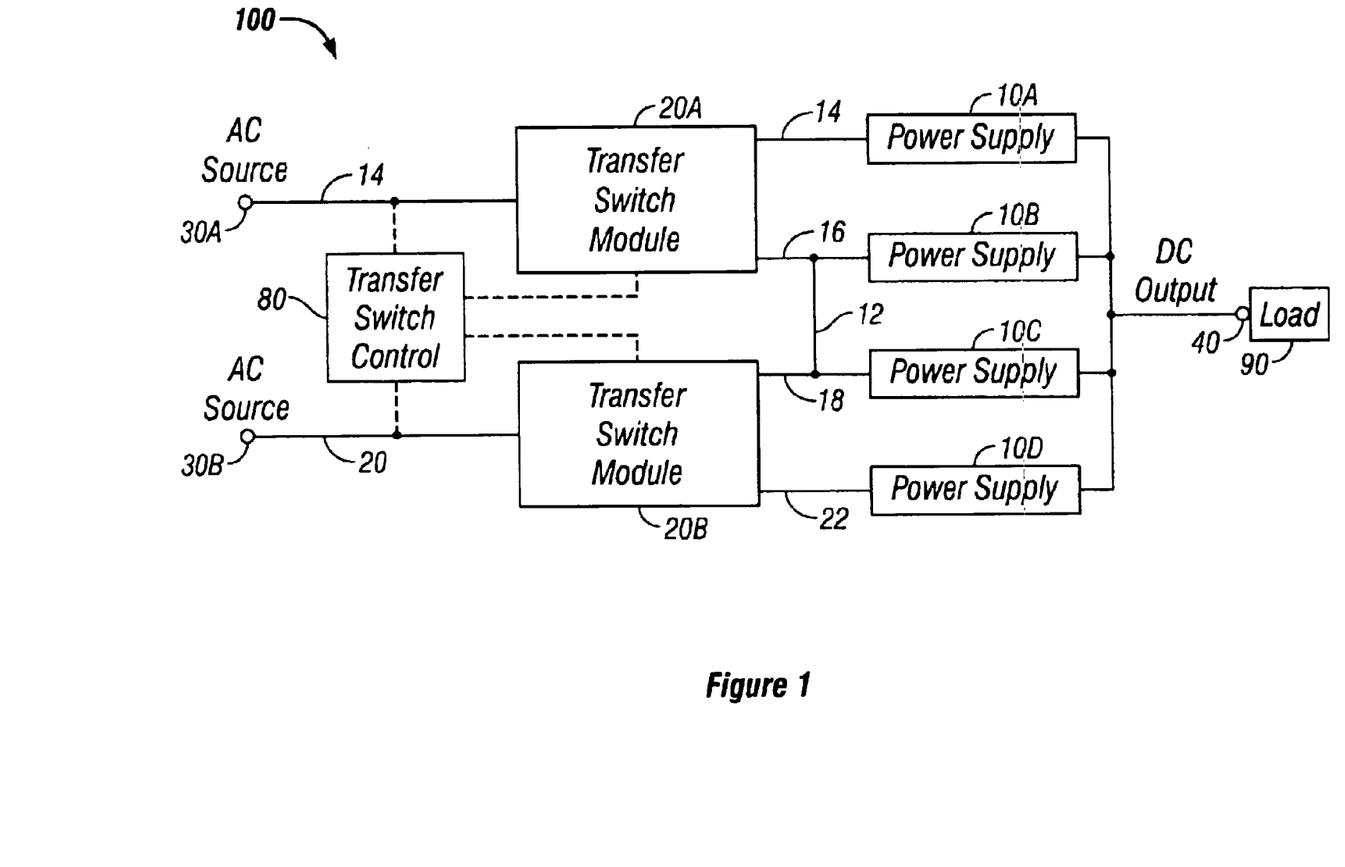
FIG. 1 is a block diagram of a power system according to one embodiment of the invention.

In FIG. 1, a power system 100 comprising redundant power supplies is depicted. In one embodiment, the power system supplies a reliable direct-current (DC) output 40 from dual alternating-current (AC) sources 30A and 30B (collectively, sources 30) to drive a load 90, such as a processor-based system. The power system 100 includes four power modules or power supplies 10A–10D (collectively, power supplies 10), a transfer switch control circuit 80, and two transfer switch modules 20A and 20B, coupled, respectively, to the AC sources 30A and 30B.

Using the nomenclature of the industry, the power system 100 is known as a "redundant 3+1" system, in which, while the AC sources are functioning, all four of the power supplies are operational while one of them is available as a backup power supply. When only one AC source is functioning, three of the four power supplies are active. As will be shown, the voltage maintained at each AC source 30A, 30B determines which three power supplies are active at a given moment.

The transfer switch modules 20 are arranged between the AC sources 30 and the power supplies 10. Nevertheless, the power supply 10A is connected directly to the AC source 30A (line 14) while the power supply 10D is connected directly to the AC source 30B (line 22). The input lines of the power supplies 10B and 10C are connected together (line 12). The output lines of the four power supplies are connected in parallel, delivering the DC output 40 to drive the load 90. In other embodiments, multiple output power supplies may be used.

The power system 100 includes relays within the transfer switch modules to automatically switch the path of one or both AC sources when the AC source exceeds a predetermined voltage range, drops to a zero voltage, or is unplugged from the power system 100. The dashed lines in FIG. 1 indicate that the transfer switch control circuit 80 is distinct and separate from the other components depicted. The transfer switch control circuit 80 monitors the AC sources 30A and 30B, then automatically activates or de-activates relays within one or both transfer switch modules 20, as described below, to change the path of current flowing through the power system 100.

Figure 2:
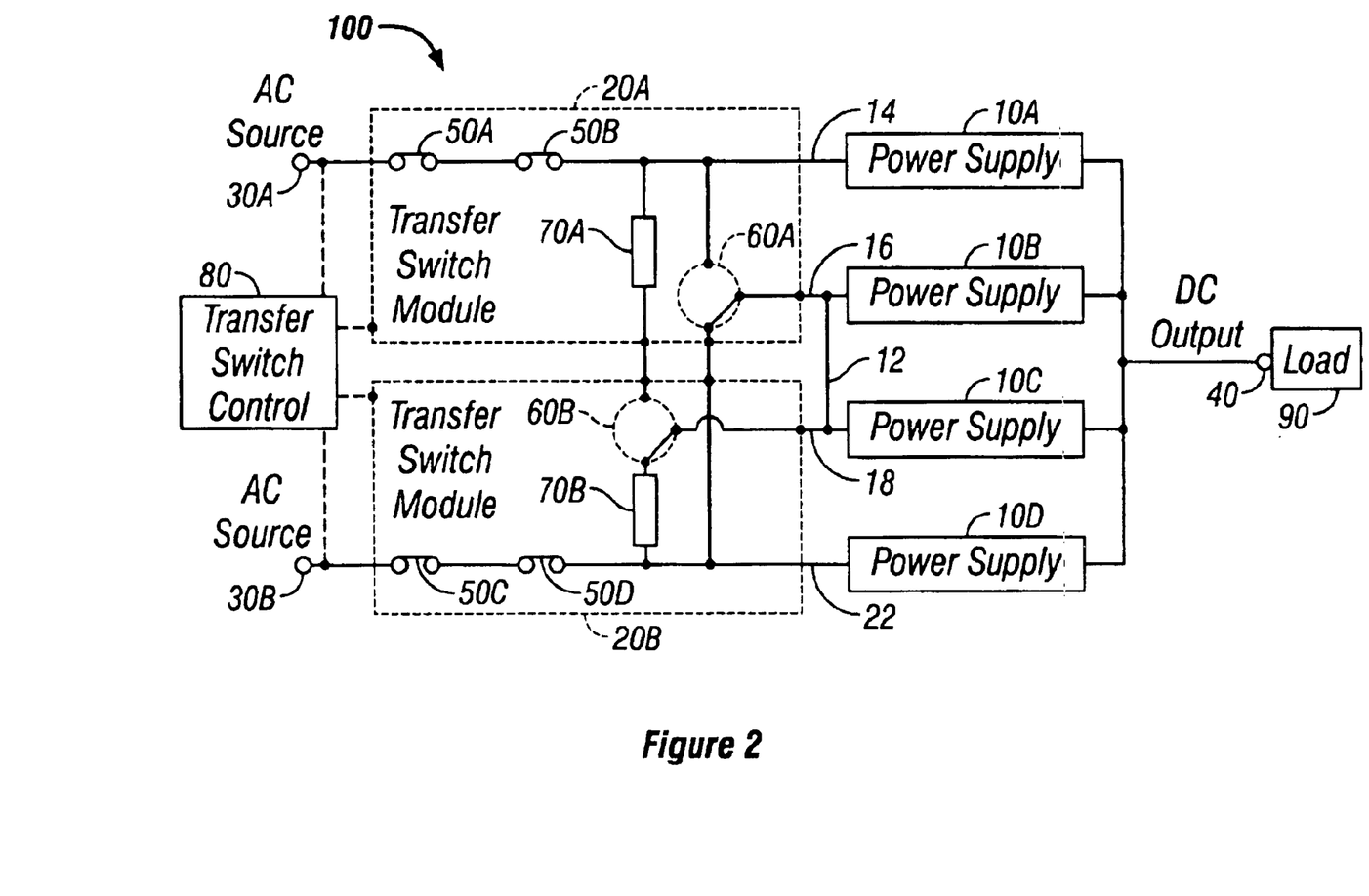
FIG. 2 is a block diagram of the power system of FIG. 1 in a first power state according to one embodiment of the invention.

The power system 100 assumes one of five possible states, as indicated in the following description. A first power state, also known as the default state, is depicted in FIG. 2. Second, third, and fourth power states are likewise depicted in FIGS. 3, 4, and 5, respectively. Where both AC sources fail or maintain an insufficient voltage, the power system 100 is said to be in a fifth power state, in which the power system 100 is turned off or shut down. Based on the voltages maintained by the incoming AC sources, the power system 100 assumes one of these five power states.

In referring to the AC sources, reference is made to particular voltages or voltage ranges. It is to be understood that, as alternating current sources, the AC sources are maintaining a voltage at a particular RMS level and frequency. For example, in the United States, a standard household outlet delivers approximately 120 volts AC at 60 Hz while in parts of Europe, 220 volts AC at 50 Hz is typically delivered. While reference throughout this document is made to particular voltages or voltage ranges, it is understood that these voltages are supplied at a particular frequency, although neither the voltages nor the frequencies referred to herein are meant to limit the scope of the invention.

For convenience, the AC source voltages are given the designations "good," "acceptable," and "bad," in reference to preferred voltages for operating the power supplies. The AC sources maintain a "good" voltage, in which the voltage is within a predetermined voltage range. As the actual voltage maintained may vary somewhat, a predetermined voltage range for a US-based system may be 90–120 volts AC, as one example.

Likewise, the AC sources maintain an "acceptable" voltage, in which some voltage is delivered, despite being outside the predetermined voltage range. The AC source voltage is characterized as a "bad" voltage when no voltage is maintained, or when the voltage is fast approaching a zero voltage, such as when the AC source has been disconnected from the power system 100.

Table 1 illustrates the relationship between the AC sources 30A and 30B and the five power states of the power system 100. Entries are included for each voltage range measured from each AC source. In one embodiment, the power system is not operational (i.e., shutdown) when neither the AC source 30A nor the AC source 30B operate in the "good" voltage range.

TABLE 1

Relationship between AC voltages and power system state

| AC source 30A | AC source 30B | power system state | relay state |
|---|---|---|---|
| good | good | 1$^{st}$ (FIG. 2) | all safety relays closed transfer switch relays de-energized |
| good | acceptable | 3$^{rd}$ (FIG. 4) | all safety relays closed transfer switch relays energized |

TABLE 1-continued

Relationship between AC voltages and power system state

| AC source 30A | AC source 30B | power system state | relay state |
|---|---|---|---|
| good | bad | 4$^{th}$ (FIG. 5) | safety relays 50A, 50B closed safety relays 50C, 50D open transfer switch relays energized |
| acceptable | good | 1$^{st}$ (FIG. 2) | all safety relays closed transfer switch relays de-energized |
| acceptable | acceptable | 5$^{th}$ (shutdown) | power system is disabled |
| acceptable | bad | 5$^{th}$ (shutdown) | power system is disabled |
| bad | good | 2$^{nd}$ (FIG. 3) | safety relays 50A, 50B open safety relays 50C, 50D closed transfer switch relays de-energized |
| bad | acceptable | 5$^{th}$ (shutdown) | power system is disabled |
| bad | bad | 5$^{th}$ (shutdown) | power system is disabled |

The terms "good," "acceptable," and "bad" are understood to be in reference to the power system's operation and are not to be construed more broadly than intended. Thus, for example, a non-zero voltage outside the predetermined voltage range is designated as "acceptable" because of its effect on operation of the power system 100 only, not because of its effect on other systems not discussed here. Further, the voltage ranges designated for each term may be adjusted according to the power supply requirements, the load requirements, and other considerations.

Figure 4:
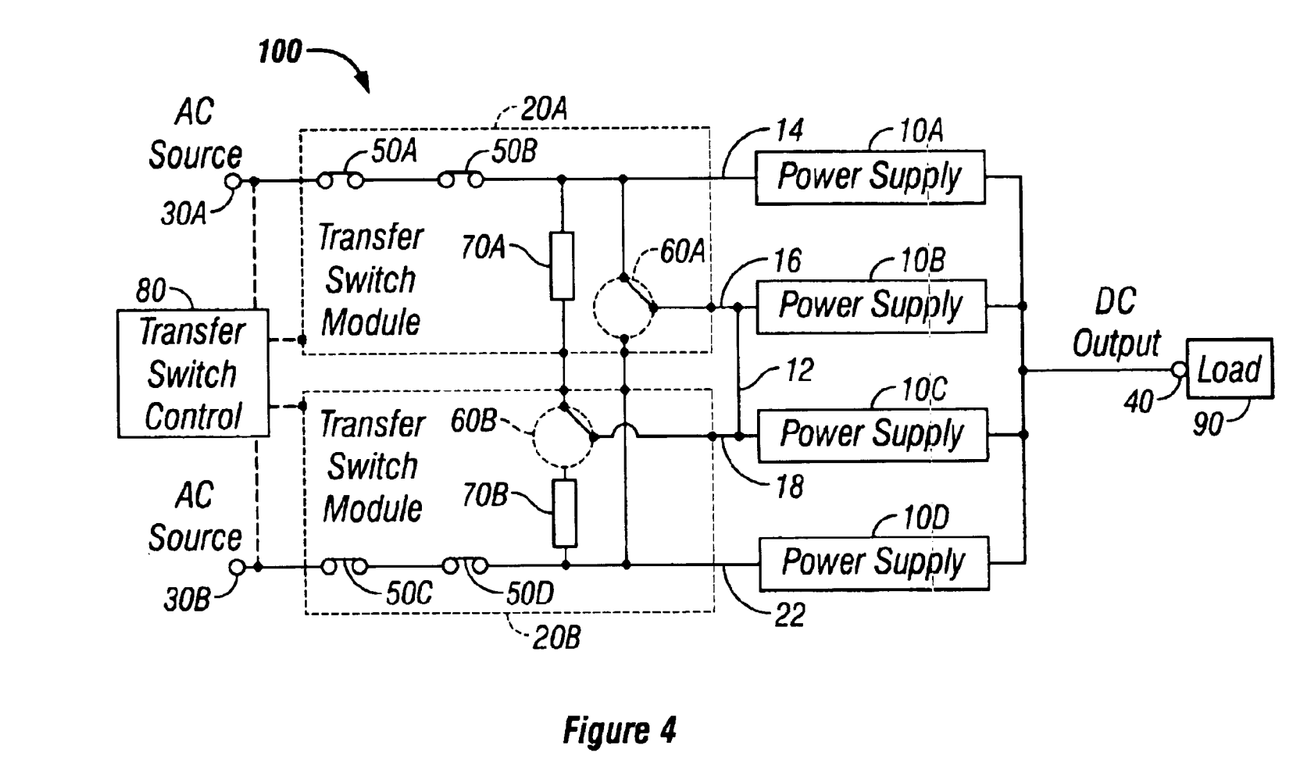
FIG. 4 is a block diagram of the power system of FIG. 1 in a third power state according to one embodiment of the invention.
Figure 5:
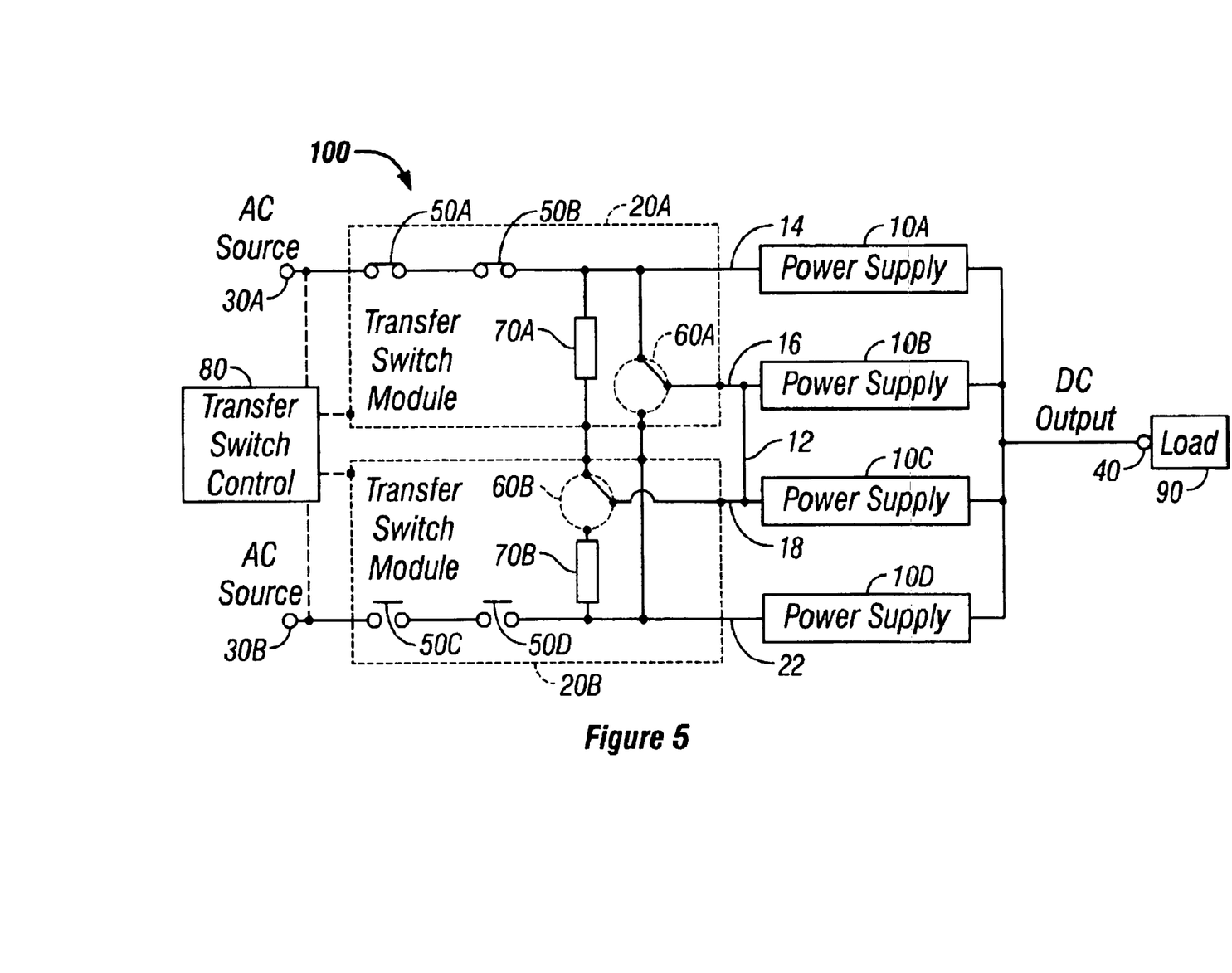
FIG. 5 is a block diagram of the power system of FIG. 1 in a fourth power state according to one embodiment of the invention.

The power system 100 assumes the first power state (FIG. 2) when the voltages maintained by the two AC sources 30A and 30B are "good," or when the voltage from the first AC source 30A (hereinafter first AC source voltage 30A) is "acceptable" while the voltage from the second AC source 30B (hereinafter second AC source voltage 30B) is "good." The power system 100 assumes the second power state (FIG. 3) when the first AC source voltage 30A is "bad" and the second AC source voltage 30B is "good." In the third power state (FIG. 4), the AC source voltage 30A is "good" while the AC source voltage 30B is "acceptable." In the fourth power state, the AC source voltage 30A is "good" while the AC source voltage 30B is "bad" (FIG. 5). These four states are described in more detail below.

In one embodiment, when the AC source voltage 30A is "good," power supplies 10A, 10B, and 10C are supplying or delivering the DC output 40 to drive the load 90, while the state of power supply 10D depends on the condition of the AC source 30B. If the AC source 30B is "good," then power supply 10D acts in parallel with the other three power supplies 10A, 10B, and 10C, one of which may be considered redundant. If the AC source 30B is "acceptable" or "bad," then the power supply 10D is disabled and only three power supplies deliver power to the load 90.

Alternatively, when the AC source voltage 30B is "good" (and the AC source voltage 30A is not "good"), power supplies 10B, 10C, and 10D deliver the DC output while power supply 10A is disabled. Controlled by the transfer switch control circuit 80, the two transfer switch modules 20A and 20B can change the path of current delivered to the power supplies from the AC sources.

The transfer switch control circuit 80 tests the AC sources 30 to determine the voltage ranges of each. The transfer switch control circuit 80 then automatically opens or closes relays within the transfer switch modules, which, in turn, changes the path of current passing through the power system 100, possibly causing the power state to change.

First Power State (Default)

FIG. 2 illustrates the first power state (default) of the power system 100 of FIG. 1, including a depiction of the transfer switch modules. Transfer switch module 20A includes dual safety relays 50A and 50B, transfer switch relay 60A, and fuse 70A. Transfer switch module 20B includes dual safety relays 50C and 50B, transfer switch relay 60B, and fuse 70B. If the safety relay has an adequate gap between its contacts, then it is possible to configure the power system 100 with single safety relays rather than dual safety relays.

In the default power state of FIG. 2, the AC sources 30A and 30B are maintaining the "good" voltage. The safety relays 50A, 50B, 50C, and 50D are closed. The transfer switch relays 60A and 60B are positioned such that power supplies 10B and 10C are connected to AC source 30B. (In FIG. 2, the transfer switch relays 60A and 60B are said to be in a "de-energized" state). Thus, the power supply 10A receives current from the AC source 30A while the power supplies 10B, 10C, and 10D receive current from the AC source 30B. All four power supplies may contribute to the DC output 40.

Alternatively, the first (default) power state is sustained when the AC source voltage 30A is outside the predetermined voltage range, yet maintains a non-zero voltage (i.e., is an "acceptable" voltage). When the AC source 30A fails to maintain a voltage within the predetermined voltage range, the transfer switch relays 60A and 60B do not change state. Power supplies 10B, 10C and 10D continue to receive current from the AC source 30B. When such a condition on the AC source 30A occurs, the power supply 10A is not relied upon to contribute to the DC output 40. Despite the change of the AC source 30A from "good" to "acceptable," the power system 100 remains in the first power state.

If, however, the AC source voltage 30A drops to zero or is unplugged (i.e., goes "bad"), the safety relays 50A and 50B open. This provides a proper safety clearance to the user-accessible AC source 30A connector. The dual relays 50A and 50B at the AC source 30A satisfy standard safety requirements known to those of ordinary skill in the art, for preventing a current from the AC source 30B to the AC source 30A when the power cord of the AC source 30A is unplugged and input contacts of transfer switch module 20A are exposed.

Figure 3:
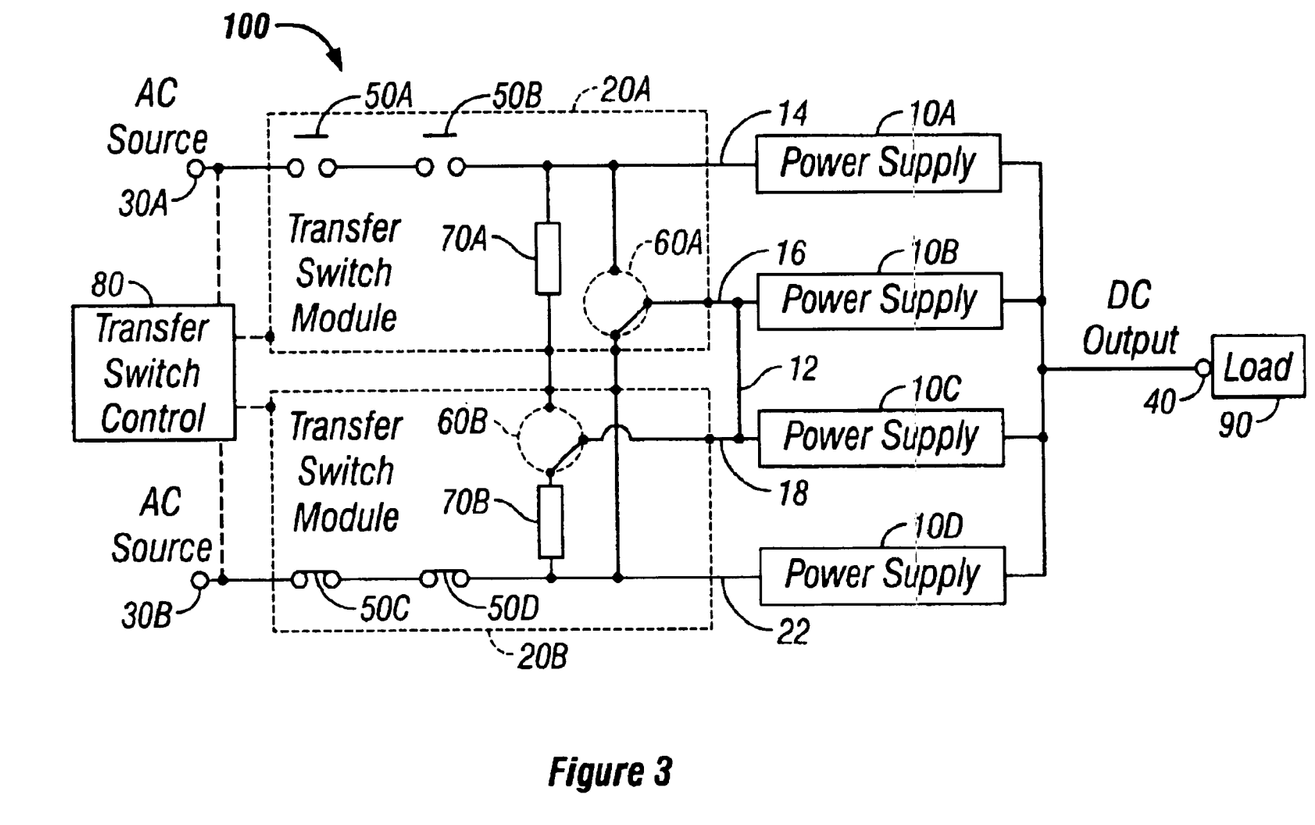
FIG. 3 is a block diagram of the power system of FIG. 1 in a second power state according to one embodiment of the invention.

The second power state of the power system 100 is depicted in FIG. 3. Here, the AC source voltage 30A is "bad" and AC source voltage 30B is "good." Safety relays 50A and 50B are opened to disconnect the AC source 30A from the rest of the circuitry, thus, preventing leakage from source 30B to 30A. The transfer switch relays 60A and 60B remain in the de-energized state. With the AC source 30B as the sole source of current, DC output 40 is supplied through power supplies 10B, 10C, and 10D, while power supply 10A is idle.

Third Power State

When the AC source voltage 30B drops to "acceptable," the transfer switch control circuitry 80 detects the condition and activates (i.e., energizes) the transfer switch relays 60A and 60B. The effect of energizing the transfer switch relays is to change the AC source (for power supplies 10B and 10C) from the AC source 30B to the "good" AC source 30A. This keeps power supplies 10B and 10C active, and ensures that full power is delivered from power supplies 10A, 10B, and 10C.

In one embodiment, transfer switch relays 60A and 60B are energized simultaneously, and vice-versa. That is, if transfer switch relay 60A is energized, transfer switch relay 60B is energized at the same time; if transfer switch relay 60B is de-energized, transfer switch relay 60A is likewise de-energized concurrently. The transfer switch control circuit 80 simultaneously activates the relays, whether to energize or to de-energize them. Nevertheless, the fuses 70A and 70B are present in case simultaneous activation does not occur. The fuses are described in more detail, below.

The third power state, in which the AC source voltage 30B drops to an "acceptable" voltage, is depicted in FIG. 4. The transfer switch control circuit 80 detects the change in voltage and simultaneously energizes the two transfer switch relays 60A and 60B. This causes the power supplies 10B and 10C to be supplied from the "good" AC source 30A. Thus, in the third power state, power is delivered to drive the load 90 through power supplies 10A, 10B, and 10C. Although the AC source voltage 30B has changed from "good" to "acceptable," some low power may continue to be delivered to the power supply 10D.

Fourth Power State

If the AC source voltage 30B drops to zero or is unplugged, the safety relays 50C and 50D open to provide safety clearance from the AC source 30B to the AC source 30A connector for the purpose of safety. The safety relays are opened to provide safety clearance from the user-accessible AC source 30B connector to the high voltage on the AC source 30A connector.

The fourth power state is depicted in FIG. 5, according to one embodiment. Safety relays 50C and 50D are opened, as shown, cutting off the AC source 30B from the power system 100. As in the third power state, the transfer switch relays 60A and 60B are energized. Accordingly, current is supplied to the power modules 10A, 10B, and 10C from the AC source 30A while the power module 10D is idle.

Once the AC source 30B recovers and is within the "good" voltage range, the safety relays 50C and 50D close to reconnect the AC source 30B to the power supply 10D and the transfer switch relays 60A and 60B return to the de-energized (default) state. In the first (default) power state, DC current is delivered to drive the load 90 from all four power supplies 10A–10D.

Safety Fuses

The fuses 70A and 70B, one in each transfer switch module 20A and 20B, respectively, protect against failures in the transfer switches 60A and 60B. If the transfer switch relay 60A is energized when the transfer switch relay 60B is stuck in the de-energized (default) state, the fuse 70B will open and disconnect the AC source 30B from the rest of the power system 100. This protects against a short occurring between the AC source 30A and the AC source 30B. To make the transfer switch modules 20A and 20B interchangeable and standard, an additional two fuses may be used in series with the transfer switch relay 60A, as in FIG. 6. The power supplies 10A, 10B, and 10C continue to receive current from the AC source 30A. Likewise, if the transfer switch relay 60B is energized when the transfer switch relay 60A is stuck in the de-energized state, the fuse 70A will open and disconnect the AC source 30A from the rest of the power system 100. This protects against a short occurring between the AC source 30A and the AC source 30B. The power supplies 10B, 10C, and 10D continue to receive current from the AC source 30B.

In one embodiment, the transfer switch modules 20 of the power system 100 are redundant. No single failure in either transfer switch module will cause the loss of full system power if all four power supplies are installed. Either of the transfer switch module 20A or 20B can be removed while the power system 100 is operating. In common parlance, the transfer switch modules are "hot-swappable." This feature allows the transfer switch modules to be maintained in a runtime setting. Additionally, any one of the power supplies is hot-swappable as well, eliminating the need for downtime during maintenance of the power system 100.

The arrangement of power supplies and transfer switch modules in the power system 100 reduces the cost and size relative to many prior art power systems. Rather than having three redundant power supplies to mirror three non-redundant power supplies, a single additional power supply provides the needed redundancy at a reduced cost, both in terms of money spent and space used. In one embodiment, the power system 100 achieves a noticeably higher power density, in terms of watts per cubic inch (W/in$^3$) by reducing the number of used modules by one third, relative to a 3+1 redundant system, which includes six power supplies. Despite having fewer power supplies, the power system 100 nevertheless supports dual/redundant AC sources. The presence of fewer power supplies results in a smaller size for the load 90 and an increase in airflow within a power-consuming unit comprising both the power system 100 and the load 90.

Figure 6:
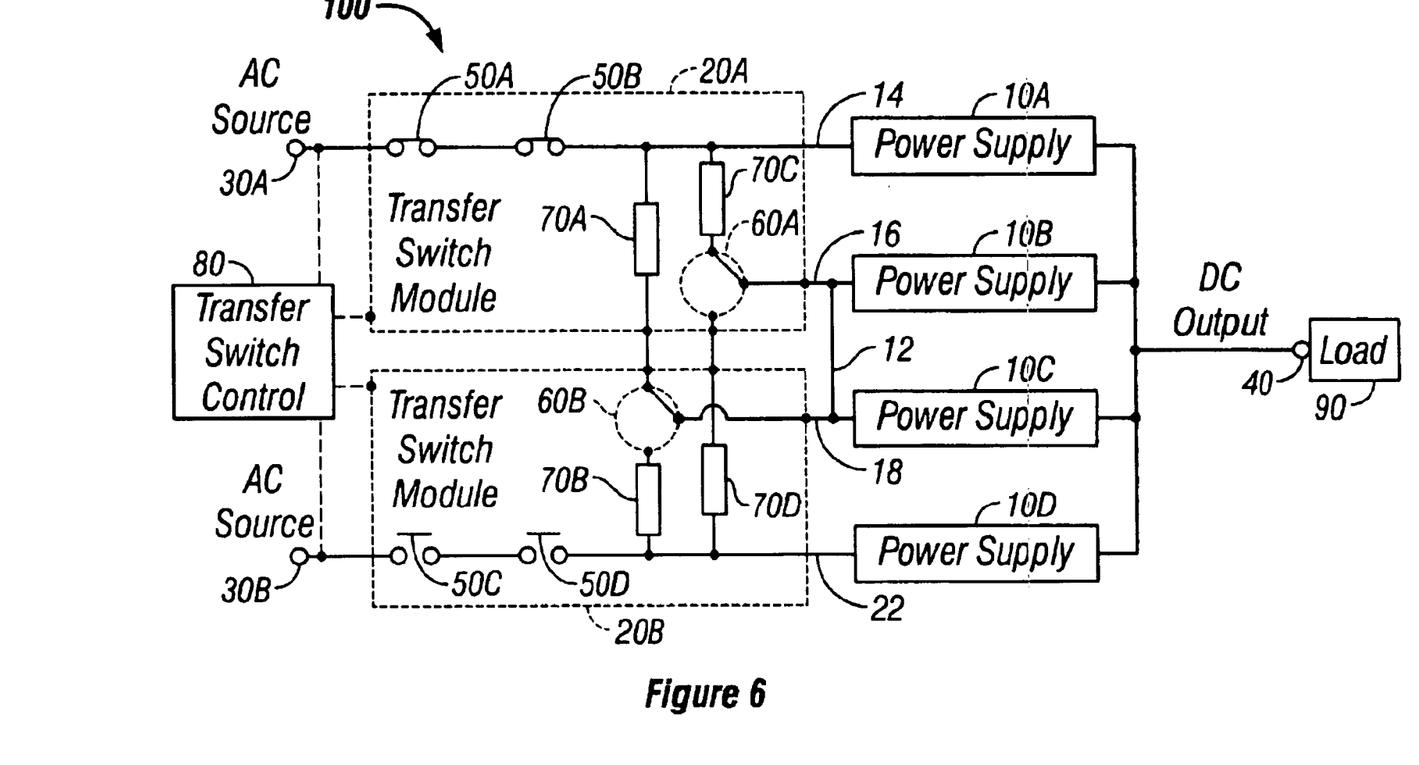
FIG. 6 is a block diagram of an alternate embodiment of the power system of FIG. 1.
Figure 7:
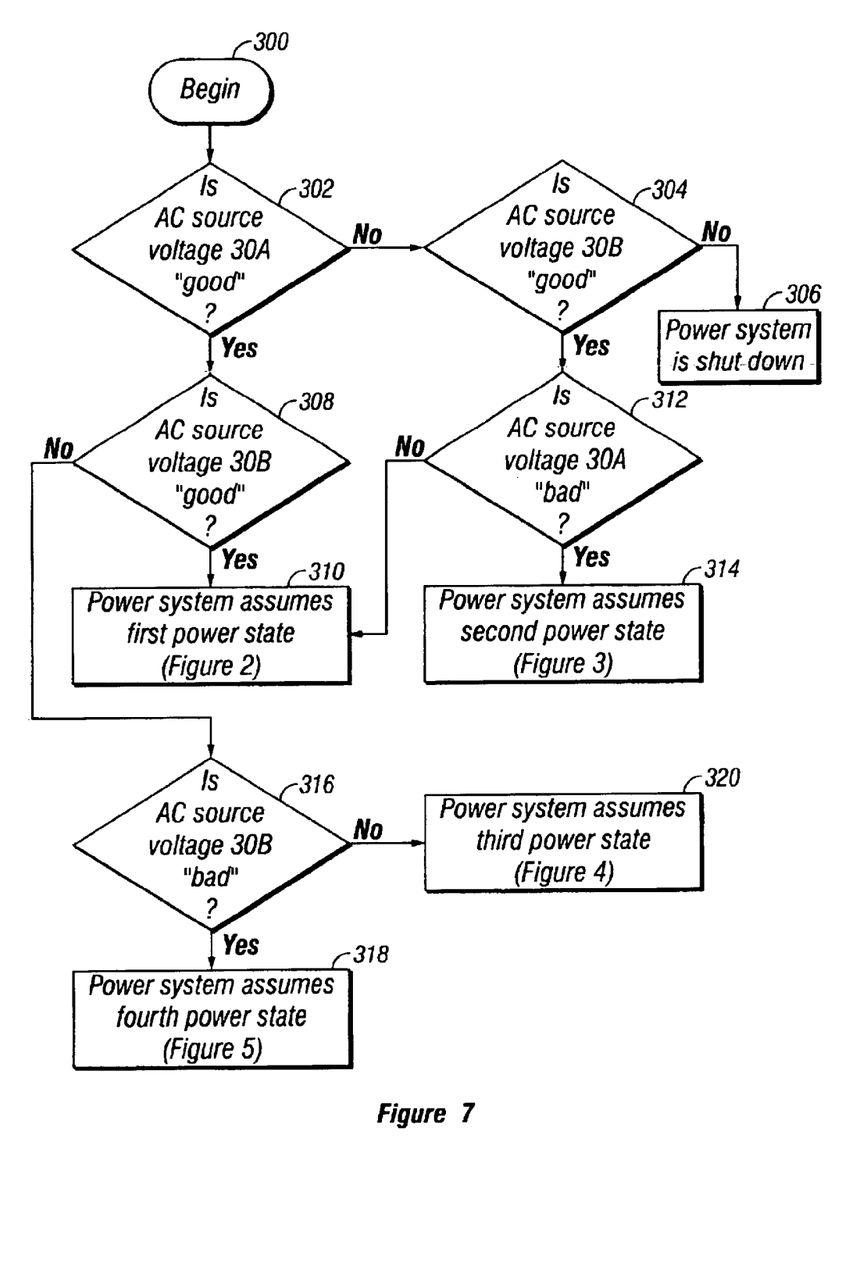
FIG. 7 is a flow diagram showing operation of the transfer switch control circuit in switching the power system between its various power states according to one embodiment of the invention.

In FIG. 6, a flow diagram illustrates how the transfer switch control module 80 logically changes the state of the power system 100. Recall that the transfer switch control circuitry 80 tests the AC sources 30 to determine whether they are maintaining a voltage within the predetermined voltage range and controls the relays within the transfer switch modules 20 when a change of state is appropriate.

In the flow diagram of FIG. 6, various steps are illustrated as occurring in a particular order. However, system designers of ordinary skill will recognize that the steps of the flow diagram may be arranged in a different order, or some steps may be performed simultaneously by different logic within the transfer switch control circuitry.

The transfer switch control circuit tests whether the AC source 30A is maintaining a "good" voltage (diamond 302). If so, the same test is performed on the AC source 30B (diamond 308). If the AC source voltage 30B is also "good," the power system 100 assumes the first (default) power state, as depicted in FIG. 2 (block 310).

If, instead, the AC source voltage 30B is not "good" (the "no" prong of diamond 308), the transfer switch control circuit tests whether the AC source 30B is "bad" (diamond 316). If so, the power system assumes the fourth power state, as in FIG. 5 (block 318). Otherwise, the AC source voltage 30B is deemed "acceptable," and the power system assumes the third power state, as in FIG. 4 (block 320).

When the AC source voltage 30A is not "good" (the "no" prong of diamond 302), the transfer switch control circuit tests whether the AC source voltage 30B is "good" (diamond 304). If not, then both AC sources are maintaining inadequate voltages and the power system is shut down (block 306). In one embodiment, the system shutdown occurs, as the power supplies internally shut down whenever the voltage source drops below a specified voltage.

If, instead, the AC source voltage 30B is "good" (the "yes" prong of diamond 304), the transfer switch control circuit tests whether the AC source voltage 30A is "bad" (diamond 312). If not, the power system assumes the default state (block 310) because the AC source voltage 30A is "acceptable." If the AC source voltage 30A is "bad" (the "yes" prong of diamond 312), the power system assumes the second power state, as depicted in FIG. 3 (block 314).

Once the power system assumes one of the five possible states, the operations of FIG. 6 are performed again. Thus, the flow diagram of FIG. 6 is understood to describe an operation that is performed by the transfer switch control circuitry periodically or continuously, as long as the power system 100 is operating.

While the invention has been described with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system for supplying direct current to drive a load, the system comprising:
    a first transfer switch module coupled to a first alternating current source, the first transfer switch module comprising:
        a first transfer switch relay; and
        first safety relays coupled between the first alternating current source and a first power supply, the first power supply having a first output, wherein the first power supply receives current from the first alternating current source when the first safety relays are closed;
    a second power supply having a second output and third power supply having a third output, wherein the second and third power supplies have connected inputs; and
    a second transfer switch module coupled to a second alternating current source, the second transfer switch module comprising:
        a second transfer switch relay; and
        second safety relays coupled between the second alternating current source and a fourth power supply, the fourth power supply having a fourth output, wherein the fourth power supply receives current from the second alternating current source when the second safety relays are closed;
    wherein the first, second, third, and fourth outputs are connected to the load and the second and third power supplies receive current from the second alternating current source as long as the second alternating current source is operating within a predetermined voltage range.

2. The system of claim 1, further comprising:
    a transfer switch control circuit which monitors the first and second alternating current sources and activates the relays based on a first voltage maintained by the first alternating current source and a second voltage maintained by the second alternating current source.

3. The system of claim 2, wherein the first and second voltages are within the predetermined voltage range, the safety relays are closed, and the transfer switch relays are de-energized.

4. The system of claim 3, wherein the transfer switch control circuit energizes the first and second transfer switch relays when the first voltage is within the predetermined voltage range and the second voltage changes from the predetermined voltage range to a second predetermined voltage range.

5. The system of claim 4, wherein the second predetermined voltage range does not include a zero voltage.

6. The system of claim 4, wherein the transfer switch control circuitry opens the second safety relays when the second voltage changes from the second predetermined voltage range to a third predetermined voltage range.

7. The system of claim 6, wherein the third predetermined voltage range includes a zero voltage.

8. The system of claim 3, wherein the transfer switch control circuit does not activate relays when the first voltage changes from the first predetermined voltage range to the second predetermined voltage range.

9. The system of claim 8, wherein the transfer switch control circuit opens the first safety relays when the first voltage changes from the second predetermined voltage range to the third predetermined voltage range.

10. The system of claim 2, wherein the transfer switch control circuit opens the safety relays when neither the first voltage nor the second voltage is within the predetermined voltage range.

11. The system of claim 1, wherein the power supplies are connected in parallel to the load and deliver direct current to drive the load.

12. The system of claim 1, wherein the first and second transfer switch modules are hot-swappable.

13. The system of claim 1, wherein the power supplies are hot-swappable.

14. A redundant power system comprising:
   a plurality of power supplies comprising at least a first power supply and a last power supply, wherein the plurality of power supplies are coupled at their outputs to a load;
   a first transfer switch module comprising first relays, wherein the first transfer switch module is coupled to a first alternating current source which maintains a first voltage, and the first transfer switch module is coupled to all but the last power supply of the plurality of power supplies such that the first voltage may be supplied thereto;
   a second transfer switch module comprising second relays, wherein the second transfer switch module is coupled to a second alternating current source which maintains a second voltage, and the second transfer switch module is coupled to all but the first power supply of the plurality of power supplies such that the second voltage may be supplied thereto; and
   a transfer switch control circuit for causing the redundant power system to assume a plurality of power states based on voltages maintained by the first and second alternating current sources;
wherein the transfer switch control circuit causes the redundant power system to assume a first power state when the first voltage and the second voltage are within a predetermined voltage range.

15. The redundant power system of claim 14, wherein the plurality of power supplies further includes a second power supply, a third power supply, and a fourth power supply, wherein the fourth power supply is the last power supply.

16. The redundant power system of claim 15, wherein the first power state comprises:
   the first alternating current source supplying current to the first power supply; and
   the second alternating current source supplying current to the second power supply, the third power supply, and the fourth power supply.

17. The redundant power system of claim 16, wherein the transfer switch control circuit causes the redundant power system to maintain the first power state when:
   the first voltage is outside the predetermined voltage range but still non-zero; and
   the second voltage is within the predetermined voltage range.

18. The redundant power system of claim 15, wherein the transfer switch control circuit causes the redundant power system to assume a second power state when:
   the first voltage is a zero voltage; and
   the second voltage is within the predetermined voltage range.

19. The redundant power system of claim 18, wherein the second power state comprises:

the first alternating current source supplying current to no power supply; and
the second alternating current source supplying current to the second power supply, the third power supply, and the fourth power supply.

20. The redundant power system of claim 15, wherein the transfer switch control circuit causes the redundant power system to assume a third power state when:
   the first voltage is within the predetermined voltage range; and
   the second voltage is outside the predetermined voltage range but still non-zero.

21. The redundant power system of claim 20, wherein the third power state comprises:
   the first alternating current source supplying current to the first power supply, the second power supply, and the third power supply; and
   the second alternating current source supplying current to the fourth power supply.

22. The redundant power system of claim 15, wherein the transfer switch control circuit causes the redundant power system to assume a fourth power state when:
   the first voltage is within the predetermined voltage range; and
   the second voltage is zero.

23. The redundant power system of claim 22, wherein the fourth power state comprises:
   the first alternating current source supplying current to the first power supply, the second power supply, and the third power supply; and
   the second alternating current source supplying current to no power supply.

24. The redundant power system of claim 14, wherein the first relays comprise a first pair of safety relays and a first transfer switch relay.

25. The redundant power system of claim 24, wherein the second relays comprise a second pair of safety relays and a second transfer switch relay.

26. A method comprising:
   monitoring a first alternating current source maintaining a first voltage;
   monitoring a second alternating current source maintaining a second voltage;
   identifying the second voltage as being within a predetermined voltage range and identifying the first voltage as being either within the predetermined voltage range or outside the predetermined voltage range but non-zero; and
   coupling the first alternating current source to a first power supply and coupling the second alternating current source to a second power supply, a third power supply, and a fourth power supply, wherein each of the four power supplies has an output connected to a load.

27. The method of claim 26, further comprising:
   identifying the first voltage as approaching zero and identifying the second voltage as being within the predetermined voltage range; and disconnecting the first alternating current source from the power supplies.

28. The method of claim 26, further comprising:

identifying the first voltage as being within the predetermined voltage range and identifying the second voltage as being outside the predetermined voltage range but non-zero; and coupling the first alternating current source to the first, second, and third power supplies and coupling the second alternating current source to the fourth power supply.

29. The method of claim 26, further comprising:

identifying the first voltage as being within the predetermined voltage range and identifying the second voltage as approaching zero; and disconnecting the second alternating current source from the power supplies.

30. The method of claim 26, further comprising:

determining that neither the first voltage nor the second voltage are within the predetermined voltage range; and disconnecting both the first and second alternating current sources from the power supplies.

* * * * *